Figure 1:
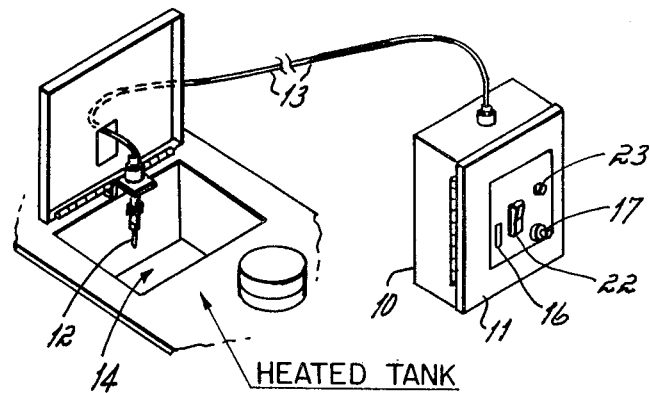

United States Patent [19]

Cohen et al.

[11] 4,413,255

[45] Nov. 1, 1983

[54] FLUID LEVEL INDICATOR

[75] Inventors: Sherman E. Cohen; Dario Ramazzotti, both of Atlanta; Michael D. Hartley, Roswell, all of Ga.

[73] Assignee: Nordson Corporation, Amherst, Ohio

[21] Appl. No.: 273,098

[22] Filed: Jun. 12, 1981

[51] Int. Cl.³ ............................................. G08B 21/00
[52] U.S. Cl. .................................. 340/622; 137/558; 219/421; 222/54; 222/146 HE
[58] Field of Search ......................... 340/622; 73/295; 137/392, 558; 222/54, 56, 146 HE, 23; 219/421

[56] References Cited

U.S. PATENT DOCUMENTS

| | | | |
|---|---|---|---|
| 1,346,898 | 7/1920 | Kingsbury | 137/392 |
| 2,211,606 | 8/1940 | Pratt | 73/295 |
| 2,286,929 | 6/1942 | Pond | 340/622 X |
| 2,394,885 | 2/1946 | Baak | 73/295 |
| 2,483,450 | 10/1949 | Wolfner | 137/392 |
| 2,580,016 | 12/1951 | Gilbert | 137/392 X |
| 2,655,933 | 10/1953 | Odell | 137/392 |
| 2,667,178 | 1/1954 | Fred et al. | 137/392 |
| 2,743,327 | 4/1956 | Barrell | 361/59 |
| 2,769,121 | 10/1956 | Rogoff | 73/295 |
| 2,824,278 | 2/1958 | Johnston | 137/392 |
| 2,924,234 | 2/1960 | Wilson | 137/392 |
| 3,151,468 | 10/1964 | Martin | 73/295 X |
| 3,333,258 | 7/1967 | Walker et al. | 137/392 |
| 3,792,456 | 2/1974 | Hill | 73/295 X |
| 3,876,037 | 4/1975 | Rath, Jr. | 137/392 X |
| 4,020,488 | 4/1977 | Martin et al. | 137/392 X |
| 4,084,204 | 4/1978 | Jacobus, Jr. | 361/72 |
| 4,183,071 | 1/1980 | Russell | 361/59 |

Primary Examiner—John W. Caldwell, Sr.
Assistant Examiner—Daniel Myer
Attorney, Agent, or Firm—Wood, Herron & Evans

[57] ABSTRACT

A low level indicator for a heated fluid in a container such as for use in indicating the glue level in a tank in a hot melt glue application. A thermistor probe is positioned at the mid-level of the container and senses the level of the heater fluid based upon sensing fluid contact with the probe. A light or alarm is activated when the heated fluid level falls below the probe, permitting of cooling the probe. The light or alarm is only activated when the probe becomes cooler subsequent to a time at which the probe was immersed in the fluid and properly heated. This conditional activation prevents continued low level alarm indications when the container is refilled with material at a temperature lower than that of the heated fluid.

5 Claims, 2 Drawing Figures

FLUID LEVEL INDICATOR

DESCRIPTION OF THE INVENTION

This invention is in the field of level indicators, and more particularly, concerns such an indicator for a heated or cooled fluid.

Conventional level indicators of the electronic type for fluid level indication are costly. Alternative float type mechanical level indicators require continual maintenance due to fluid buildup on moving parts.

As a further alternative, temperature sensitive level indicators have been proposed. Such indicators include one or more thermally sensitive probes positioned at a particular height in the fluid-bearing container. As the fluid is removed from the container, the probe is no longer in contact with the fluid and comes into contact with the ambient air. The difference in temperature, or in heat sinking capability, between the fluid and the ambient air is detected by circuitry, usually including a bridge, connected to the probe; and an appropriate low level indication is produced. Thereupon, the container is either manually or automatically refilled with the fluid.

In replenishing the fluid level in the container, if the temperature at which the fluid is used, or withdrawn from the container, is greater or less than the ambient temperature, such as through heating or cooling means associated with the container, the temperature sensitive element may give a false low level indication even subsequent to refilling of the container if the added material differs in temperature, such as by being at the ambient temperature from the temperature of the fluid already in the container. The solution to this problem would appear to call for complex temperature compensation circuitry or the undesirable alternative of using multiple probes, thereby adding to the expense of the level sensing arrangement.

It is consequently an object of the present invention to provide a level indicator for a fluid in a container which is thermally responsive to the fluid and yet eliminates false level signals due to temperature variations of the fluid upon refilling of the container.

It is a subsidiary object of the invention to provide such a level indicator which is operable to initiate refilling of the container after a true low level signal has been produced.

Figure 2:
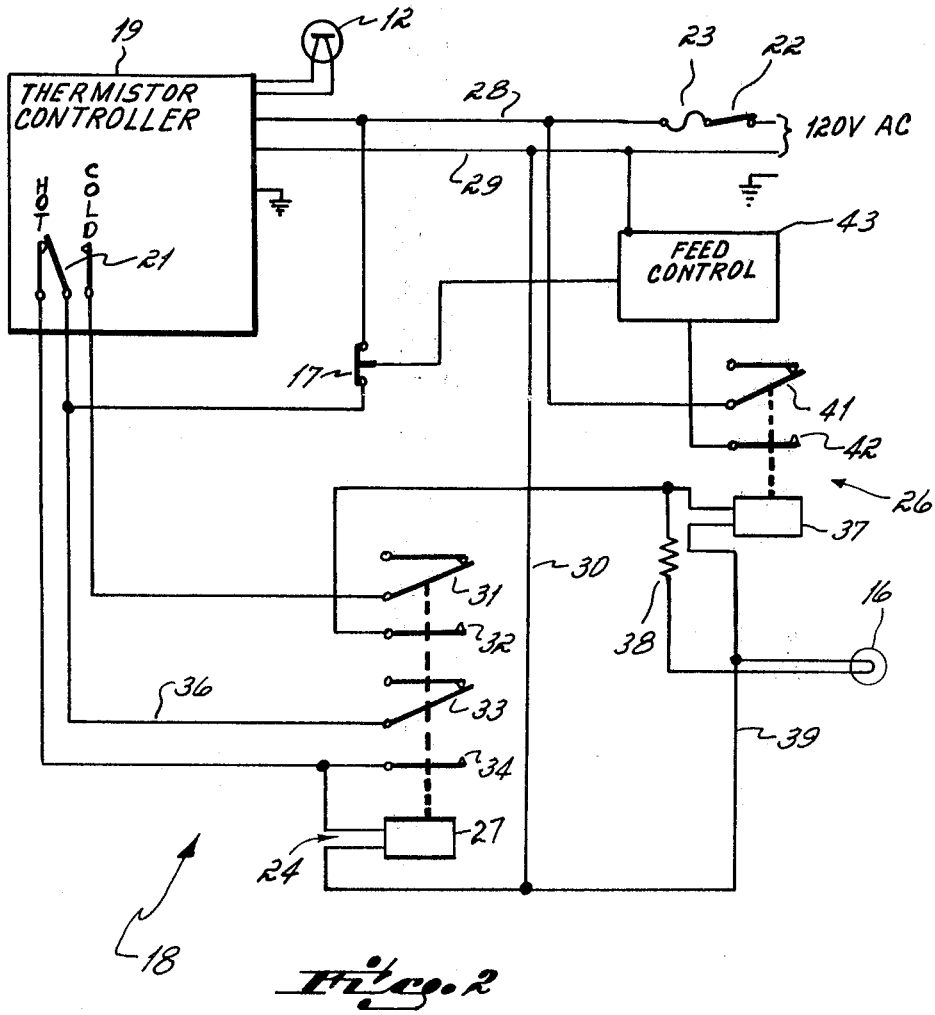

Other objects and advantages of the invention will become apparent upon reading the following detailed description and upon reference to the drawings, in which:

FIG. 1 is a perspective view of a container with an associated level sensor and low level indicating arrangement; and FIG. 2 is a schematic wiring diagram of the circuitry of the level indicating arrangement of FIG. 1.

In meeting the above-mentioned objects of the invention, there is disclosed herein a level indicator for a fluid in a container which includes means for enabling a low level indication only after the container has been refilled and the fluid in the container has reached its operating temperature.

In the illustrated form of the invention, a low level indicator for heated glue in a hot melt glue tank is disclosed. In such an arrangement, a thermistor probe is positioned in the glue tank approximately midway between the top and the bottom of the tank. The glue tank includes heating coils and a thermostatic control for heating the glue to an operating temperature, and the heated glue is subsequently withdrawn from the tank at an outlet near its bottom for application to objects to be glued.

When the thermistor probe senses the hot glue, the low level indicator, such as a light, is deactivated by the associated indicator control circuitry. When the glue level falls below the probe, the probe cools slightly and the control circuit activates the low level light. Subsequently, either an operator or an automatic feeding apparatus adds cold glue pellets to the heated glue in the tank, refilling the tank. The low level indicator control circuitry is reset, and the low level indicator light goes out. Control circuitry is operable to prevent reactivation of the low level light until after the added glue pellets have melted and the tank has heated the glue sufficiently to heat the thermistor probe to the operating temperature, the probe being once again immersed in hot glue.

While a specific embodiment of the invention, a hot melt glue tank level indicator, has been shown by way of example in the drawings and will herein be described in detail, it should be understood that it is not intended to limit the invention to the particular form disclosed, but, on the contrary, the intention is to cover all modifications, equivalents, and alternatives falling within the spirit and scope of the invention as defined by the appended claims. For example, while the invention is described with regard to a low level indicator for a heated liquid in a container from which liquid is withdrawn at the bottom, it is contemplated that the invention would also be applicable to cooled fluids as well as heated fluids and also applicable to indicating the fill level of containers from which a fluid is withdrawn from an upper portion thereof rather than a lower portion.

With reference now to the Figures, a level control arrangement for a hot melt glue tank includes an indicator control box 11 electrically connected to a thermistor probe 12 by a pair of conductors in a cable 13. The tip of the thermistor probe 12 is positioned approximately midway into the glue tank 14, which is shown empty of glue for purposes of illustration. In operative condition, the tank 14 is substantially full of molten glue which is heated by thermostatically controlled coils (not shown) beneath the tank. The heated glue is removed from the tank as needed through an opening (not shown) at the bottom of the tank. When the level of the hot glue falls beneath the tip of the thermistor probe 12, a low level indicator light 16 is actuated. The addition of "cold" glue pellets to the molten glue remaining in the tank 14 returns the level in the tank to "full", but reduces the temperature of the glue and pellet mixture in the tank in the vicinity of the probe 12. Despite this lowered temperature, the depression of a reset momentary switch 17 deenergizes the light 16 to cancel the low level alarm indication. The low level light is not again activated until the glue level once again falls below the tip of the thermistor probe 12 following heating of the glue to the desired temperature.

In order to properly activate the low level indicator light 16 in response to the resistance characteristic of the thermistor 12, a control circuit 18 substantially contained in the control box 10, is provided. The thermistor 12 is coupled to a thermistor controller 19 which includes a Wheatstone bridge, a relay, and an SCR for energizing the relay. When the controller bridge is unbalanced by a low (less than desired) temperature thermistor resistance, the imbalance is amplified and fed to the triggering SCR, which energizes the relay. The movable contact 21 of the controller relay is normally in the HOT position illustrated, and when activated by the unbalanced bridge moves to the COLD position. The thermistor controller 19 is a FENWAL series 194 thermistor sensing temperature controller, specifically a type 28-230803-305, manufactured by Fenwal, Inc., of Ashland, Mass. The controller 19 is powered from a 120 volt ac source through a power switch 22 and fuse 23, although the controller is compatible with other source voltage inputs.

In accordance with the invention, the relay internal to the thermistor controller 19 conditions a control relay 24 to enable the indicator light 16. The indicator light 16, when enabled, is activated when the glue level falls below the tip of the probe 12 and the movable contact 21 of the thermistor controller moves to the COLD position.

In order to condition the control relay 24, the tank 14 must be filled with hot glue to a point at which the probe 12 is contacted by the glue, and the glue must be at or beyond the temperature necessary to maintain the movable contact 21 in the HOT position. In this case, the control coil 27 of the relay 24 is connected across the input ac power lines 28 and 29, and thereby actuated. The connection path is from the line 28, through the normally closed reset switch 17, through the movable contact 21 and the fixed HOT contact, the control relay coil 27, and the line 30 to the power line 29. Activation of the coil 27 closes the two pairs of contacts (31, 32 and 33, 34) of the control relay 24.

Closing the contacts 33, 34 latches the relay 24 on by providing an additional path connecting the relay coil 27 across the power lines 28, 29. This path is from the line 28, through the normally closed switch 17, a line 36, the closed contacts 33, 34, the coil 27 and the line 30 to the power line 29. Thus, assuming that the reset switch 17 remains closed, the contacts 31, 32 and 33, 34 of the control relay 24 will be held closed regardless of the subsequent position of the movable contact 21 of the thermistor controller 19.

The closed contacts 31, 32 provide the actual enabling of the indicator light 16. The closed contacts 31, 32 establish a path from the COLD contact of the thermistor controller 19 through the closed contacts 31, 32 and the light 16 to the power line 29. The actual path is from the COLD contact through the contacts 31, 32, a dropping resistor 38, the indicator light 16, and the lines 39 and 30 to the power line 29. Connected in parallel with the light 16 and the resistor 38, and similarly connected between the COLD contact and the power line 29, is a relay coil 37 for an output relay 26. The function of the output relay 26 shall be discussed in more detail hereinafter.

As can be seen, after the control relay 24 has been conditioned, latched on by the thermistor controller 19, subsequent movement of the movable contact 21 to the COLD position connects the output relay coil 37 and the low level indicator light 16 across the power lines 28, 29. The conduction path is from the line 28, through the switch 17, the movable contact 21 and the COLD contact, the contacts 31, 32, the parallel relay coil and light combination, the line 39, and the line 30 to the other power line 29.

Thus, the contact with sufficiently heated (to the desired temperature) glue by the thermistor probe 12 causes movement of the movable contact 21 to the HOT position and latches on the control relay 24. Subsequent lowering of the glue level causes the thermistor 12 to change to a resistance indicative of a lower temperature, and the movable contact 21 of the controller 19 moves to the COLD position. The control relay 24 remains latched on and therefore the low level indicator light is activated from the power lines through the closed contacts 31, 32 of the control relay 24. The output relay 26 is similarly activated.

If the glue tank 14 is to be refilled manually, an operator pours an appropriate quantity of glue pellets into the tank 14 in response to the energization of the low level indicator light 16. At the time that the operator refills the tank 14, he also depresses the reset switch 17, which momemntarily opens the contacts of the switch, and disconnects the power line 28 from the contacts 33, 34 of the control relay 24. With the connection thus opened, the relay 24 unlatches and the two pairs of contacts 31, 32 and 33, 34 open. The opening of the contacts 31, 32 deenergizes the low level indicator light 16 and the output relay 26. The control relay 24 is not conditioned to enable the output relay 26 and indicator 16 light until the movable contact 21 has again returned to the HOT position. This return of the movable contact 21 will occur only after the glue mix, to which the glue pellets have been added, has reached the critical temperature as sensed by the thermistor probe 12 to balance the bridge in the controller 19. Meanwhile, while the glue mix and pellets are heating, the presence of the contact 21 in the COLD position is insufficient to activate the low level indicator light 16 since the contacts 31, 32 of the control relay 24 are open. Thus, a "false" low level indication is not given even though the refilled glue mix has a temperature below the desired elevated temperature.

In addition to the above-mentioned activation of the low level indicator light 16 (when the light is properly enabled by the control relay 24 and the movable contact 21 of the thermistor controller 19 is moved to the COLD position), the control coil 37 of the output relay 26 is also activated. Activation of the output relay 26 closes a pair of contacts 41, 42, which to energize an automatic feed control 43 for the glue pellets for the tank 14. Thus, in response to a valid low level indication, the feed control 43 dispenses a premeasured quantity of glue pellets into the tank 14. The automatic feed control 43 also automatically resets the momentary switch 17.

What is claimed is:

1. A level indicator for heated glue in a hot melt glue tank which includes a heater for heating the glue comprising:

a thermistor positioned in the tank intermediate its top and bottom;

a thermistor controller coupled to the thermistor and operable to produce a first output when the thermistor is below an operating temperature for the heated glue and to produce a second output when the thermistor is at or above the operating temperature;

an indicator;

a relay coupled to the thermistor controller and to a source of power and operable to become latched in an energized condition by the source of power in response to said second output and operable when latched to couple the indicator to the energizing source of power when the thermistor controller produces the first output; and a switch for permitting unlatching the relay by decoupling the relay from the source of power.

2. A level indicator for a variable temperature fluid in a container from which fluid is added and removed, the container having associated means for altering the temperature of the fluid in the container from an ambient temperature, comprising:

a temperature sensitive element positioned in the container in contact with the fluid so long as a certain amount of fluid remains in the container;

an electrically activated indicator; and a control circuit, coupled to the temperature sensitive element and to the electrically, activated indicator, including, means for producing an enabling output if the temperature of the temperature sensitive element reaches a certain temperature, means for producing an indicator output if the temperature of the temperature sensitive element is not beyond said certain temperature from ambient, and means responsive to said enabling output and said indicator output for electrically activating the indicator in response to an indicator output preceded by an enabling output.

3. The level indicator of claim 2 which further comprises feed control means for adding fluid to the container activated by the indicator activating means when the indicator is activated.

4. A level indicator for a heated liquid in a container from which the liquid is added and removed, the container having an associated heater for heating the liquid in the container, comprising:

a temperature sensitive element positioned in the container and contacting the fluid so long as a certain amount of fluid remains in the container;

an electrically activated indicator for indicating that the liquid in the container is less than said certain amount;

a control circuit, coupled to the temperature sensitive element and to the electrically activated indicator, including, means for producing an enabling output if the temperature of the temperature sensitive element is above a certain temperature, means for producing an indicator output if the temperature of the temperature sensitive element is below said certain temperature, and means, responsive to said enabling output and to said indicator output, for electrically activating the indicator in response to an indicator output which is preceded by an enabling output.

5. A method for indicating a low level condition for a heated liquid in a container comprising the steps of:

sensing the temperature of the liquid at a location in the filled container;

sensing a lowered temperature at said location when the liquid level falls below the location;

activating the indicator in response to the sensed lower temperature;

replenishing the liquid in the container such that the temperature of the liquid in the refilled container is at a lowered temperature and disabling the indicator;

heating the liquid in the refilled container to said certain temperature;

enabling the activation of the indicator when the temperature of the liquid has reached said certain temperature;

sensing a subsequent lowered temperature at said location when the liquid level again falls below the location;

and activating the indicator in response to the sensed lowered temperature.

* * * * *